June 1, 1926.

C. HEATH

TREE PLANTING DEVICE

Filed Oct. 26, 1923

1,586,676

Inventor
Charles Heath

By
Attorney

Patented June 1, 1926.

1,586,676

UNITED STATES PATENT OFFICE.

CHARLES HEATH, OF MORRIS, ILLINOIS.

TREE-PLANTING DEVICE.

Application filed October 26, 1923. Serial No. 670,924.

This invention relates broadly to the art of training and cultivating nursery stock trees and shrubbery, etc. for transplanting purposes, but is more especially concerned with the proper cultivation of young fruit-bearing trees and the like which obtain their fruit-bearing qualities from the soil near the surface of the ground.

The primary object of the invention is to provide novel means for promoting the growth and the vitality of such young trees and to this end embodies a device adapted for use not only as a means of training the roots of the trees so as to cause them to be directed laterally below the surface of the ground, but also as a watering device for supplying the roots with sufficient moisture, even in dry seasons.

It is the further object of the invention to provide a device of the character above set forth which is so constructed as to provide a receptacle in which the tree is supported when planted in the ground, the said receptacle being of such material as to readily decompose after a suitable period during which time the tree has been able to gain a material start with respect to its growth.

Further objects and advantages of the invention may be apparent from the following description wherein the use and practical application of the same is explained, reference being had to the accompanying drawing, wherein:—

Figure 1:
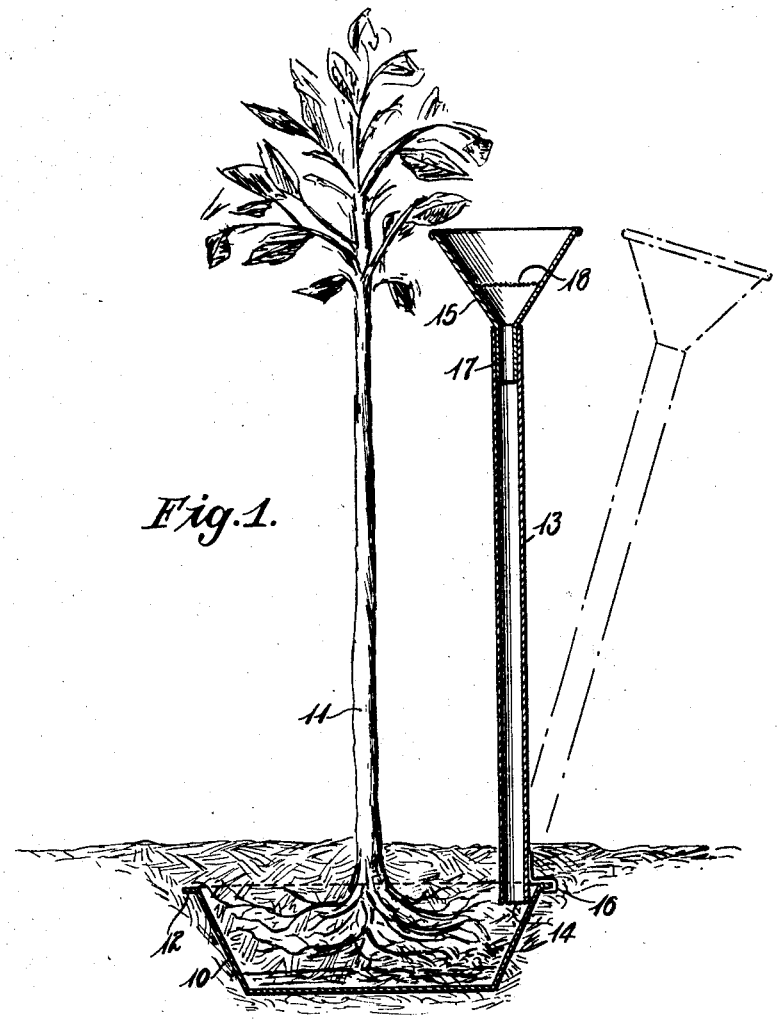
Figure 2:
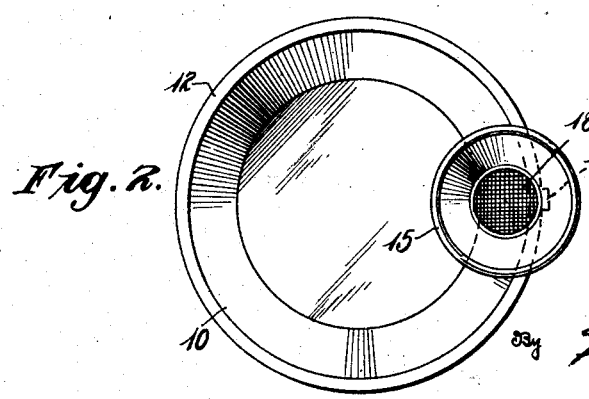

Figure 1 is a view of a stock tree with the invention applied thereto, the latter being in section, and Figure 2 is a top plan view of the invention.

In the proper cultivation of nursery stock trees and shrubs it is essential to the life of the tree, etc., that the roots be sufficiently watered and in the case of fruit trees which obtain their fruit-bearing qualities from the sub-soil, adjacent the surface of the ground, it is important that the roots be trained to locate also adjacent the surface of the ground. Otherwise, the center or a root of the tree will penetrate to such a depth below the sun-warmed surface of the ground as to eventually become chilled, resulting in the root dying out and leaving the center or heart of the tree in a gradually decaying state. The consequent result is that the tree develops from first having only a dead top to a finally hollow trunk which, of course, results in the destruction of the fruit-bearing qualities of the tree and its consequent loss.

The present invention is designed to eliminate this possible dying out of the tree from the results above stated and is therefore constructed so as to prevent the roots from penetrating downward beyond a suitable distance. This is accomplished, in the present instance, by the provision of the pan 10 having the sides flaring outwardly as the top of the pan is approached. This pan is adapted to receive and support the young tree or shrub indicated at 11 and is to be made in any size required. It is preferred, however, that the pan be one inch or more longer in diameter than the spread of the roots across the top, and it may be of any material, such as coke tin, as will decompose. Extending outwardly from adjacent the top of the pan is an integrally formed flange 12 having a slight taper or slope, as shown. The pan is of imperforate material so as to hold water, a suitable quantity of which is supplied thereto through tube 13.

Tube 13 consists of a convenient length of pipe having a strainer 14 at its lower end and a removable funnel 15 at its upper end. This tube is adapted to be mounted on pan 10 and is provided, adjacent its lower end, with a flexible spring clasp 16 arranged to engage over the flange 12 of the pan for supporting the tube in either vertical position as shown in the full line of Figure 1, or in the tilted position as indicated in the dotted line structure. It will thus be seen that the tube is supported on one side of the pan and spaced apart from the plant with its lower end resting on the inner face of the flaring side wall of the pan.

The funnel 15 is provided with a short depending stem 17 which engages in the upper end of tube 13 in the manner shown clearly in Figure 1, and a strainer 18 is fixed in the funnel a slight distance above the mouth of the stem.

In using the device above described, a hole is first dug in the ground a little wider than the pan which is then placed therein. The pan should be set level, which can be readily determined by placing about one inch of water in the pan. When the pan is level the tree or shrub is then placed in center of pan and pipe 13, with the funnel attached thereto, is engaged with the flange 12 and is set either vertically or leaning outwardly a trifle from the tree. The required amount of soil is then packed lightly around the base of the tree subsequent to which a generous supply of water is placed in the tube 13 and funnel 15. In this connection it may be noted that more water is to be supplied to the tree when first planted than at subsequent stages in its growth.

From the above arrangement it will be seen that the soil enveloping the roots of the tree is plentifully supplied with moisture at all times, even in medium dry seasons when it is most difficult to adequately supply the roots with moisture necessary to promote the growth of the tree regardless of how often or how much the surface ground is watered.

As the tree develops in growth the roots are constrained by the bottom and sides of the pan to move upwardly in a circle so that they will glance off the taper flange 12 by which they are directed laterally so as to be properly located with respect to the surface ground from which they obtain sustenance to the proper growth and cultivation of the tree.

From the above it will be seen that the invention provides convenient means for planting nursery stock trees and shrubs, etc., and at the same time assures the efficient watering of the roots. The arrangement of the tree-supporting receptacle and the removable funnel-bearing tube insures, also, a reservoir of water which is constantly fed to the tree for long periods.

Having thus described the invention, what I claim is:—

1. A tree-planting device comprising a shallow plant-receptacle having a flaring side wall terminating at its upper end in a laterally directed flange, and a watering device consisting of a tube having a clasp adjacent its lower end for detachable connection with the said flange, said clasp serving as a support for holding the tube in upright position with its lower end bearing on the inside face of the said flaring side wall of the receptacle.

2. A tree-planting device comprising a shallow plant receptacle having a flaring side wall terminating at its upper end in a laterally directed flange, and a watering device consisting of a tube having a clasp adjacent its lower end for detachable connection with the said flange, said clasp serving to support the tube in upright position with its lower end bearing on the inside face of the said flaring side wall of the receptacle and being sufficiently flexible to permit inclination of the tube from an upright to a slightly tilted position.

In testimony whereof I affix my signature.

CHARLES HEATH.